UNITED STATES PATENT OFFICE.

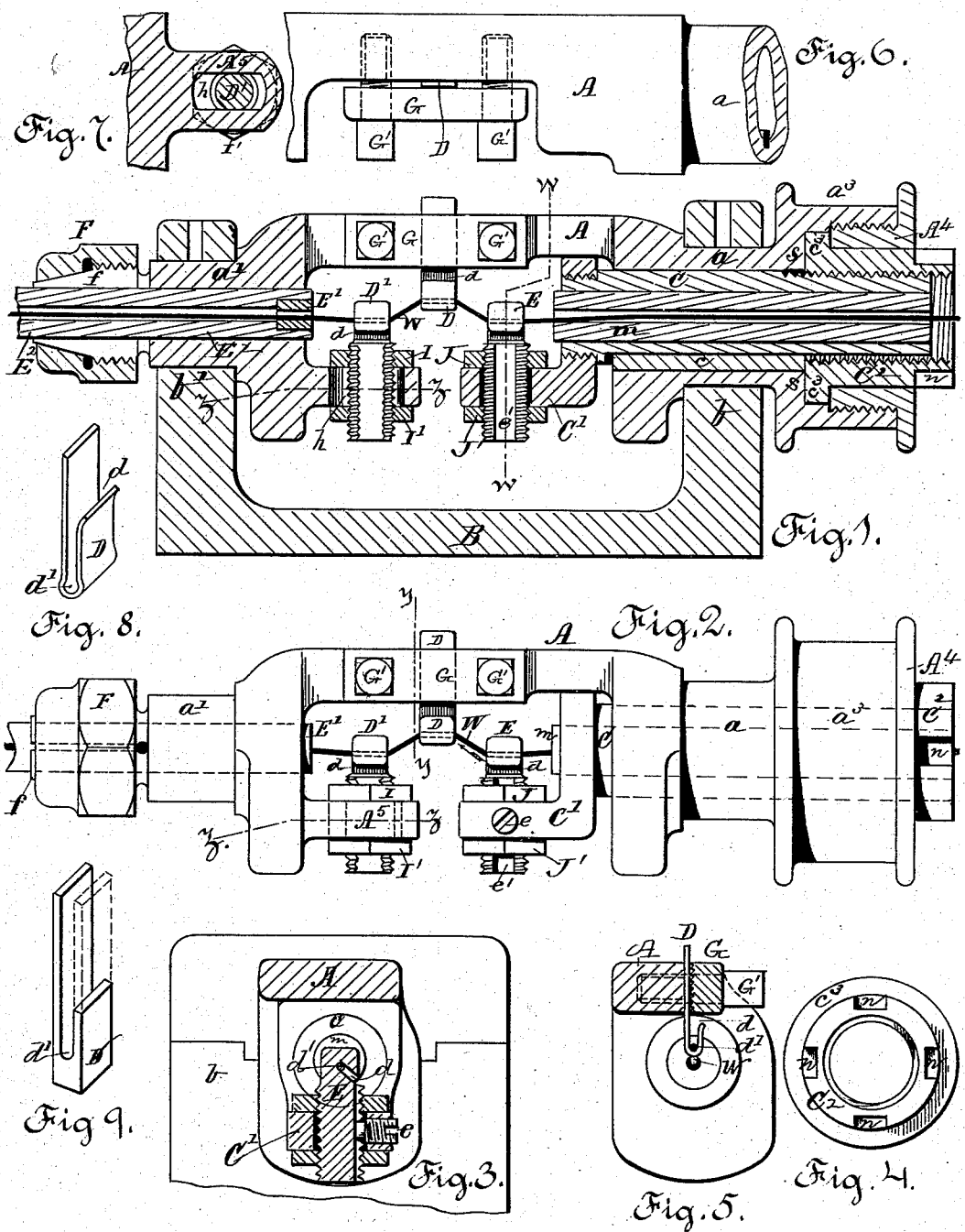

CARL ÅNGSTRÖM, OF WORCESTER, MASSACHUSETTS.

MACHINE FOR STRAIGHTENING WIRE.

SPECIFICATION forming part of Letters Patent No. 293,213, dated February 12, 1884.

Application filed September 19, 1883. (No model.)

*To all whom it may concern:*

Be it known that I, CARL ÅNGSTRÖM, a subject of the King of Sweden, residing at Worcester, in the county of Worcester and State of Massachusetts, have invented certain new and useful Improvements in Machines for Straightening Wire; and I declare the following to be a description of my said invention sufficiently full, clear, and exact to enable others skilled in the art to which it appertains to make and use the same, reference being had to the accompanying drawings, which form a part of this specification.

The objects of my present invention are to provide a wire-straightening machine having dies or guides for the wire which are adapted for both radial adjustment and adjustment in longitudinal direction, or in direction parallel with the axis of the revolving mandrel; to provide wire guides or dies that open at the side, or are made in the form of hooks, into which the wire can be introduced without threading it through the eye of the guide; to provide a guide-loop of flat metal and means for clamping it to the mandrel for retaining it at position of adjustment; to provide a chuck for clamping the tubular end guide within the hollow of the mandrel for retaining it at any position of adjustment; to provide means for positively adjusting and retaining the tubular guide-carrier in the end of the mandrel. These objects I attain by mechanism, the nature, construction, and operation of which is illustrated in the drawings and explained in the following description, the particular subject-matter claimed being hereinafter definitely specified.

In the drawings, Figure 1 is a longitudinal central section of a wire-straightening machine, illustrating the features of my invention. Fig. 2 is a side view of the revolving mandrel with the wire guides or dies. Fig. 3 is a transverse vertical section at the position of line $w\,w$. Fig. 4 is an end view of the nut or sleeve for securing and adjusting the tubular guide-carrier. Fig. 5 is a vertical section at line $y\,y$. Fig. 6 is a plan view, showing the manner of attaching the flat intermediate guide to the mandrel. Fig. 7 is a horizontal section at line $z\,z$, Fig. 8, a perspective of the flat metal wire guide or die loop, and Fig. 9 is a perspective view of a flat wire-guide of modified construction.

In reference to the drawings, A denotes the revolving mandrel provided with hollow journals $a\,a'$ at its ends, which are mounted in suitable bearings, $b\,b'$, on the supporting-frame B, and provided with a pulley or surface, $a^3$, for the driving-belt.

C designates a tubular stud or guide-carrying sleeve, arranged through the hollow journal $a$ of the mandrel A, parallel with its axis, and fitted for longitudinal adjustment therein. Said tube is retained from independent rotation by means of a spline or key, $c$. On the inner end of the tube C is fixed an arm, C', that supports the radially-adjustable end guide, E, and within the hollow of the tube is arranged a bushing, $m$, made of wood, soft metal, or other suitable material, that receives the wear and prevents excessive vibration of the wire W in front of the guide E as it enters the machine. The outer end of the tube C is provided with a screw-thread, and a flanged sleeve or nut, $C^2$, is arranged thereon, the flange $C^3$ of which is fitted to a recess formed for its reception within the mandrel A or its pulley $a^3$, while an annular collar, $A^4$, is arranged around said nut and fitted to the mandrel by screw-threads, so as to turn down close to the flange $C^3$, for confining it against the shoulder $s$, while allowing sufficient looseness to permit of the sleeve-nut $C^2$ being readily turned on the threaded tube C when desired, for effecting the positive longitudinal adjustment of the guide-carrying tube C and end guide, E, which is forced inward or outward by the action of the screw-thread, accordingly as the sleeve-nut $C^2$ is revolved to the right or left. The sleeve-nut $C^2$ is provided with notches $n$, or equivalent means, to facilitate its being conveniently turned by a spanner or wrench. The collar $A^4$ may have its outer rim extended to form the flange for the driving-pulley $a^3$, if desired.

E' designates the end guide, and $E^2$ its supporting-bushing, which is arranged at the opposite end of the mandrel, and through which the wire W passes when leaving the machine. The bushing $E^2$, for holding the guide E', may be made of wood or of suitable metal, as preferred. Said guide is fitted to the opening in the mandrel-journals $a'$, and is preferably made adjustable longitudinally; or, if preferred, might be permanently fixed in place. In the present instance the mandrel A is extended beyond the journal-bearing, and is provided with a tapered longitudinally-slitted end, $f$, having a screw-thread, on which is screwed a conically-bored nut, F, which forces the divided end $f$ of the mandrel inward, thus forming a chuck for holding the bushing and guide E' firmly in position. If desired, a similar chuck could be employed at the opposite end of the mandrel or upon the tubular stud C, for retaining the bushing $m$, in which case said tubular stud C would be extended for a sufficient distance beyond the outer end of the nut C' and properly slitted and threaded, to receive the chuck-nut, in a manner similar to that shown at F $f$.

The intermediate guides, D D'—i. e., those located to act upon the wire at positions between the end guide E and the opposite end guide E'—are supported in connection with the mandrel A in such manner as to permit of their ready adjustment in direction longitudinally with the axis of the mandrel, as well as in a direction radially to or from said axis, thus admitting of said guides being placed so as to give greater or less spring to the wire, or so as to be worked nearer to or farther from each other and the end guides, E and E', thereby rendering the mechanism adaptable to wires of different grades, sizes, and qualities of stock. The wire-receiving ends of the intermediate guides are formed as open flat hooks or loops, into which the wire can be introduced through the space $d$ without the necessity of threading its end through the guiding-eye $d'$. Said guides may be formed from a flat band of metal having its end bent over in the manner indicated in Fig. 8, with the eye $d'$ more or less expanded, accordingly as the guides are intended for carrying larger or smaller sizes of wire. Another method by which the flat guides may be formed is to saw the slot $d$ into a piece of metal for proper distance to give the eye $d'$, and then cut off one of the sides, as indicated in Fig. 9. These flat guide-bars D are secured to the side of the mandrel by means of a cap-bar, G, with set-screws G', as indicated, the shank of the guide being clamped firmly between said bar G and the side of the mandrel, which latter is made to correspond with the axial center, so that the guide will stand in proper working relation to the end guides, E and E'. By making the guide D flat and securing it by the bar G and screws G' in the manner described ready and convenient adjustment of said guide can be effected in either radial or longitudinal direction, or the guide can be placed as desired in relation to the other guides.

The intermediate guide, D', is herein shown as made with a screw-threaded shank flattened on its front and rear sides and mounted in a longitudinal slot, $h$, formed in the part $A^5$ of the mandrel A, where it is retained at any adjusted position by means of nuts I I', fitted upon the screw-threads of the guide, and which are turned up against the part $A^5$ for clamping the parts in place. The flat sides of the guide-shank prevent the guide from turning out of place, and the length of the slot $h$ permits the longitudinal adjustment of said intermediate guide. The end guide E is in similar manner provided with nuts J J', for facilitating the radial adjustment and retention of said guide on its carrier-arm C', and said guide is prevented from turning out of place by means of a screw, $e$, the end of which enters a groove, $e'$, formed in the shank of the guide E, as shown in Figs. 2 and 3. The side openings for guides formed as shown at D' and E may be made by sawing a slot, $d$, diagonally into the guiding-eye $d'$, as indicated in Fig. 3.

In a former application for Letters Patent I have illustrated and described a wire-straightening machine having longitudinally-adjustable end guides, and I do not therefore herein broadly claim such feature. The construction and arrangement of the end guides and the means for effecting and retaining them at positions of adjustment, as herein shown, are, however, features of improvement different from what I have heretofore shown and claimed in my former application.

What I claim as of my invention, and desire to secure by Letters Patent, is—

1. In a rotary wire-straightening machine, an intermediate wire-guide adapted for longitudinal adjustment in relation to the revolving mandrel and end guides, as and for the purpose set forth.

2. In a rotary wire-straightening machine, the combination, with the revoluble mandrel provided with longitudinally-adjustable end guides, of the intermediate wire guide or guides adjustable in longitudinal direction, as set forth.

3. In a rotary wire-straightening machine, the combination, with the mandrel, of the intermediate wire-guides adapted for adjustment both radially and in longitudinal direction, substantially as set forth.

4. A guide for rotary wire-straightening machines having its wire-guiding eye formed with an opening or slot, $d$, for admitting the wire into said guide from one side without the necessity of threading its end through the eye, as set forth.

5. The guide D, for rotary wire-straightening machines, formed as a loop or hook of flat metal, with the guiding-eye $d'$ and passway $d$, for the introduction of the wire, substantially as set forth.

6. In a rotary wire-straightening machine, the combination, with the revolving mandrel, of a wire-guide having flattened sides, and a clamp device for connecting said guide with the mandrel and retaining it at any desired position of radial and longitudinal adjustment, as set forth.

7. The combination, with the revoluble mandrel A in a wire-straightening machine, of the flat wire-guide D, the clamp-bar G, and set-screws G', for the purposes set forth.

8. In a rotary wire-straightening machine, the combination, with a tubular guide or bushing, as E', of a revoluble mandrel having the divided and tapered end $f$, and the conically-bored chuck-nut F, for compressing said tapered end inward upon said bushing, as and for the purpose set forth.

9. The combination, with the revolving mandrel, of the longitudinally-adjustable tube or guide carrier provided with an arm, C', carrying radially-adjustable wire-guide E, substantially as and for the purpose set forth.

10. The combination, with the revoluble arbor A and longitudinally-adjustable tube carrying the wire guide or guides E, of the flanged sleeve-nut $C^2$, fitted with a screw-thread upon said tube, and the collar $A^4$, fitted with a screw-thread within the mandrel end, as and for the purposes set forth.

11. The combination, with the revoluble mandrel, of the longitudinally-adjustable tube C, carrying a radially-adjustable wire-guide as E, the radially and longitudinally adjustable intermediate guide, D, and the radially and longitudinally adjustable guide D', as and for the purposes shown and described.

Witness my hand this 13th day of September, A. D. 1883.

CARL ÅNGSTRÖM.

Witnesses:
CHAS. H. BURLEIGH,
S. R. BARTON.